United States Patent
Ovsiannikov (10) Patent No.: US 8,462,377 B2
(45) Date of Patent: Jun. 11, 2013

(54) METHOD, APPARATUS, AND SYSTEM FOR REDUCTION OF LINE PROCESSING MEMORY SIZE USED IN IMAGE PROCESSING

(75) Inventor: Ilia Ovsiannikov, Studio City, CA (US)

(73) Assignee: Aptina Imaging Corporation, George Town (KY)

( * ) Notice: Subject to any disclaimer, the term of this patent is extended or adjusted under 35 U.S.C. 154(b) by 1624 days.

(21) Appl. No.: 11/878,605

(22) Filed: Jul. 25, 2007

(65) Prior Publication Data

US 2009/0027727 A1 Jan. 29, 2009

(51) Int. Cl.
*G06K 15/00* (2006.01)

(52) U.S. Cl.
USPC ............... 358/1.17; 348/222.1; 348/231.6; 382/232; 382/233

(58) Field of Classification Search
None
See application file for complete search history.

(56) References Cited

U.S. PATENT DOCUMENTS

| | | | |
|---|---|---|---|
| 2002/0012131 A1* | 1/2002 | Oteki et al. | 358/1.15 |
| 2002/0021827 A1* | 2/2002 | Smith | 382/124 |
| 2004/0042668 A1* | 3/2004 | Kaplinsky et al. | 382/232 |
| 2004/0045030 A1* | 3/2004 | Reynolds et al. | 725/110 |
| 2004/0196390 A1* | 10/2004 | Shimazu et al. | 348/231.99 |
| 2004/0201714 A1* | 10/2004 | Chung | 348/220.1 |
| 2004/0201721 A1* | 10/2004 | Baharav et al. | 348/222.1 |
| 2005/0141772 A1* | 6/2005 | Okada | 382/238 |
| 2006/0023079 A1* | 2/2006 | Sugitani | 348/222.1 |
| 2006/0214819 A1* | 9/2006 | Deoka et al. | 341/50 |
| 2006/0291706 A1* | 12/2006 | Gunstream et al. | 382/128 |
| 2007/0183678 A1* | 8/2007 | Sankar et al. | 382/254 |
| 2007/0247532 A1* | 10/2007 | Sasaki | 348/231.99 |
| 2008/0007795 A1* | 1/2008 | Yoshitani et al. | 358/448 |

OTHER PUBLICATIONS

U.S. Appl. No. 11/878,606, filed Jul. 25, 2007, Jerdev.

* cited by examiner

*Primary Examiner* — Benjamin O Dulaney (57) ABSTRACT

A method, apparatus, and system are provided by which image line data of an image frame is compressed before being stored to image line memory used in multiple image line processing.

26 Claims, 7 Drawing Sheets

METHOD, APPARATUS, AND SYSTEM FOR REDUCTION OF LINE PROCESSING MEMORY SIZE USED IN IMAGE PROCESSING

FIELD OF THE INVENTION

Embodiments of the invention relate generally to the field of image processing and, more particularly, to a reduction in memory size used in multiple line image processing.

BACKGROUND OF THE DISCLOSURE

Memory requirements can be a significant consideration in designing any data processing device or system. Such consideration is especially important in the design of system-on-chip (SOC) devices, which squeeze most if not all circuit functions on a single chip. One use of memory that consumes significant chip space in SOC imager devices which perform image processing operations is the storage of multiple lines of image data in on-chip line buffers, such that the lines of image data may be simultaneously accessed during some image processing operations. Thus, reduction in the size of on-chip line buffers is especially desirable for SOC imager devices.

DETAILED DESCRIPTION OF THE DRAWINGS

In the following description, reference is made to the accompanying drawings, which form a part hereof. The description is provided to enable those of ordinary skill in the art to make and use the invention; and to set forth several, non-limiting embodiments of the invention. Structural, logical, and procedural changes can be made without departing from the spirit and scope of the invention.

Embodiments described herein enable a reduction in the size of on-chip memory used by an SOC integrated circuit, particularly an SOC imager device which uses line buffers for image processing operations. However, those skilled in the art will appreciate that the described embodiments may also be applied to reduce the size of other types of memory used in other types of data processing applications.

Figure 1:
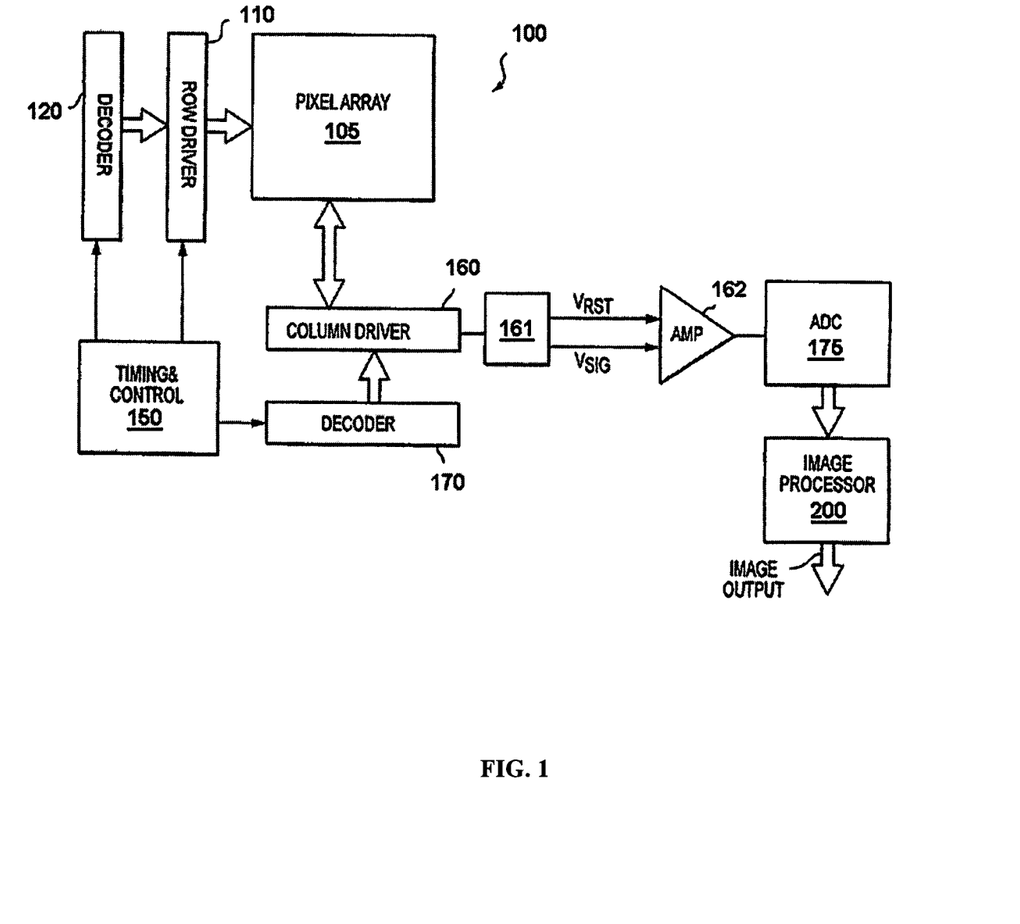
FIG. 1 is a block diagram of a conventional imager device and associated readout and image circuits.

FIG. 1 illustrates a non-limiting example of a conventional integrated circuit (IC) complementary metal oxide semiconductor (CMOS) imager device 100, which may be implemented via an SOC design. The imager device 100 includes a pixel array 105 containing a plurality of pixels arranged in rows and columns. A color filter array is provided over the pixel array 105, such that each pixel outputs a signal associated with a color. For example, a known Bayer color filter pattern may be used such that pixels of array 105 are associated with red, green, and blue colors. The pixels of each row in array 105 are all turned on at the same time by a row select line, and the pixels of each column are selectively output by respective column select lines.

The imager device 100 also includes readout circuitry. In particular, the row lines are selectively activated by a row driver 110 in response to a row address decoder 120. The column select lines are selectively activated by a column selector 160 in response to a column address decoder 170. The pixel array 105 is operated by a timing and control circuit 150, which controls the address decoders 120, 170 to select the appropriate row and column lines for pixel image capture integration and signal readout. The pixel column signals, which for a CMOS imager include a pixel reset signal (Vrst) and a pixel image signal (Vsig) for the readout of each pixel, are read by a sample and hold circuit 161 associated with the column selector 160. A differential signal (Vrst-Vsig) is produced by differential amplifier 162 representing a pixel signal value for each pixel, which is amplified and digitized by analog-to-digital converter 175 (ADC).

Figure 2:
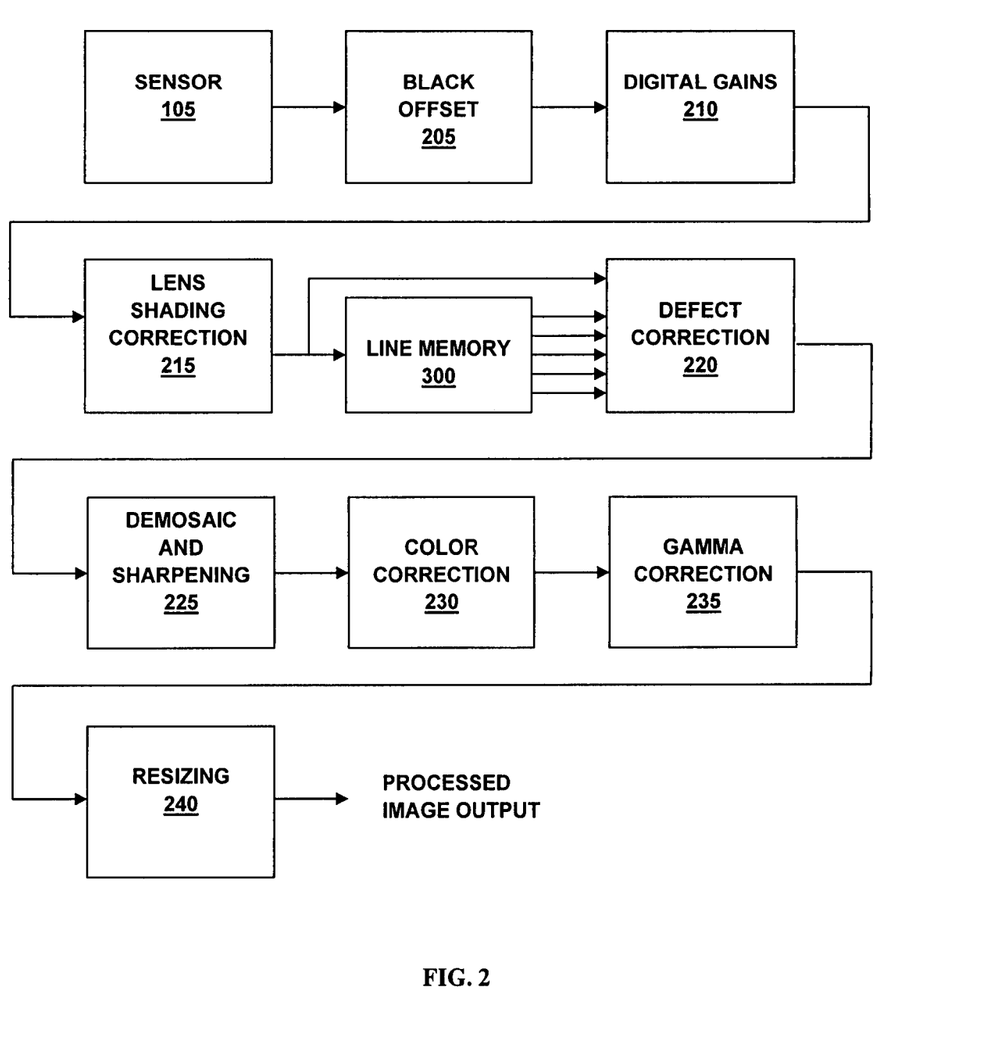
FIG. 2 is a block diagram of an image processing circuit 200 of the invention which is part of the FIG. 1 imager device and which may employ disclosed embodiments.

The analog-to-digital converter 175 supplies the pixel data to an image processing circuit 200. FIG. 2 illustrates a non-limiting example of some processing operations which may be performed on image pixel data by the image processing circuit 200. As can be seen, these processing operations may include: black level offset correction 205, digital gain 210, lens shading correction 215, defect correction 220, demosaic and sharpening 225, color correction 230, gamma correction 235, and resizing 240. Some processing operations, such as defect correction, require multiple lines of image data. Thus, lines of image data are sequentially output from the lens shading correction stage 215 to the line memory 300, where the lines of image data are stored to five line buffers (discussed below) and then simultaneously output as a part of a set of six respective lines of image data to the defect correction stage 220. As noted, FIG. 2 is merely an example of image processing operations which may be performed on image data.

Figure 3A:
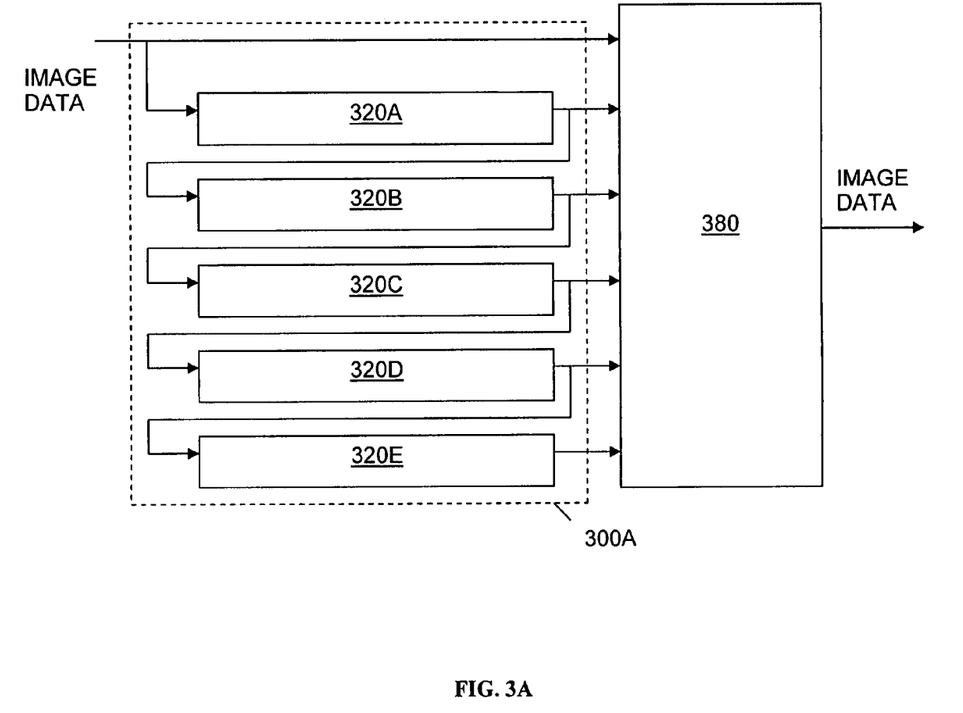
FIG. 3A is a block diagram of a line memory 300A which may be employed by the image processing circuit 200.

FIG. 3A illustrates a non-limiting example of a line memory 300A. As shown, individual line buffers 320A-E are serially connected in a first-in-first-out (FIFO) arrangement that queues the incoming lines of image data. Each of the line buffers 320A-E reads out a respective line of image data to the next line buffer (with the exception of the last line buffer 320E). Each of the line buffers 320A-E also reads a respective one of the five stored lines of image data to a processing stage 380 of the image processing circuit 200. In addition, a sixth line of image data is input directly to the processing stage 380. By this configuration, six sequential lines of image data are simultaneously made available to the processing stage 380 for image processing, e.g., lines 1-6 of an image frame (with lines 1-5 respectively read out of the line buffers 320A-E and line 6 input directly to the processing stage 380), then lines 2-7 of the image frame, and so on. The processing stage 380 of FIG. 3A represents the defect correction processing stage 220 associated with the line memory 300 of FIG. 2, but could be another type of processing stage 380. Further, though in this example six lines of image data are stored and read out by the line memory 300A, this number may be varied in accord with the associated processing operations.

Figure 3B:
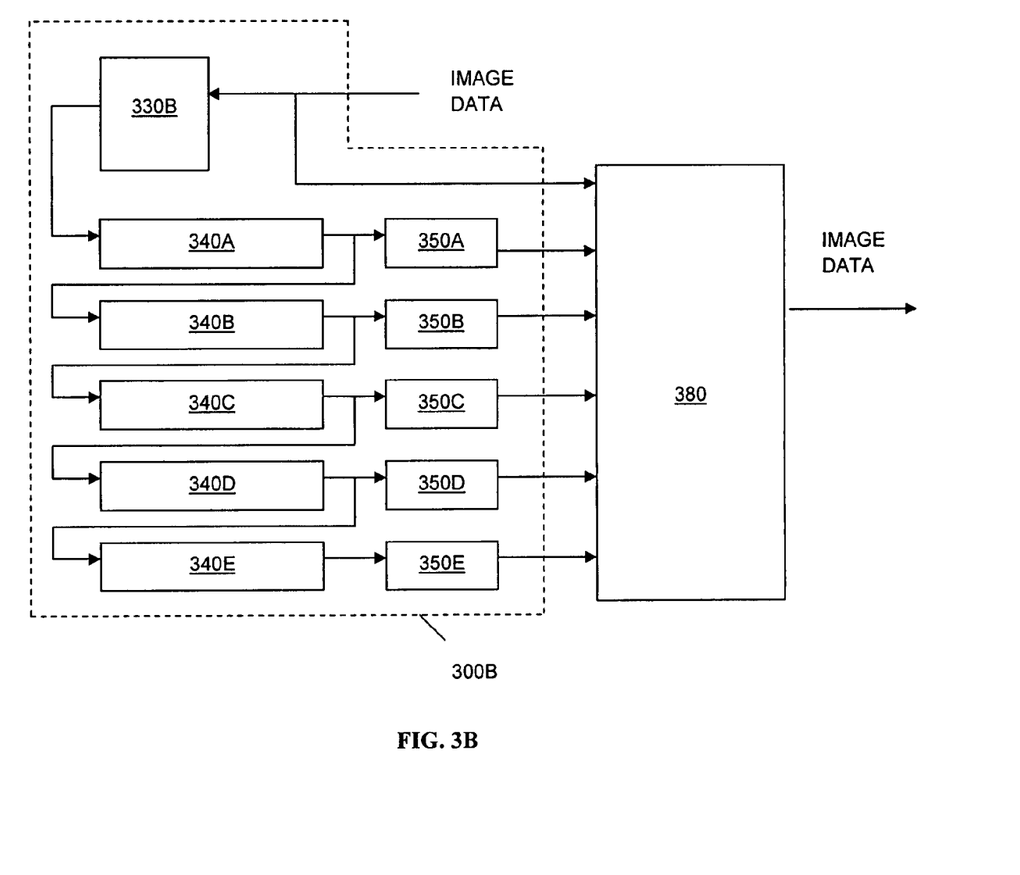
FIG. 3B is a block diagram of a line memory 300B which may be employed by the image processing circuit 200.

In order to reduce the size of the line memory 300A, a compression system may be employed to compress the incoming lines of image data before they are stored to the line buffers 340A-D. FIG. 3B illustrates a non-limiting example of another line memory 300B, which includes a data line compressor 330 for compressing and writing data to the first line buffer 340A of a series of line buffers 340A-E. As noted above, imager devices often utilize lines of image data for multiple line processing by first storing the lines of data in a manner that permits the image lines to be accessed for processing by a processing stage of the image processing circuit 200. In the FIFO arrangement of the line buffers 340A-E, as a new line of image data is written into a first line buffer 340A, the line of image data stored in each of line buffers 340A-D is moved down by one line into each of the next line buffers 340B-E, respectively, and the last line of image data in buffer 340E is removed. The data compressor 330 compresses each line of incoming image data so that the size of the line buffers 340A-E can be reduced. Thus, each line buffer 340A-E has a bit-length capacity less than that required to store a full line of uncompressed image data generated by the imager device 100. The line buffers 340A-E may be part of static random access memory (SRAM), which is faster and more reliable than the more common dynamic random access memory (DRAM), though DRAM line buffers may also be used.

As shown in FIG. 3B, a first line of uncompressed incoming data, which may come from the output of the ADC 175 or from an upstream image processing stage, is input to the compressor 330, which compresses and writes lines of image data to line buffers 340A-E. As a first line of compressed data is serially passed from buffer 340A to buffer 340B, a second line of compressed data is written from the compressor 330 to buffer 340A, and so on. While the compressed lines of data are passed in sequence along the line buffers 340A-E, the lines of compressed data are made simultaneously available to respective decompressors 350A-E for decompression, which in turn output the lines of decompressed image data to a processing stage 380 in the image processing pipeline that processes data held in the line buffers 340A-E. Thus, processing stage 380 in FIG. 3B represents one or more of the processing stages 205 . . . 240 illustrated in FIG. 2. The five lines of image data stored to the line buffers 340A-E are but one example of the number of lines which may be stored, as a greater or fewer number of lines of image data may be used by an associated image processing stage 380. For example, a line of image data may be input from the compressor 330 to the line buffers 340A-E, and output of the line buffers 340A-E may be multiplexed to the decompressors 350A-E to thus avoid power expenditures associated with copying data from one line buffer memory to another one.

Various compression techniques may be employed to compress and decompress the image data. In one example noted above, 10-bit pixel values are converted to respective 8-bit values by removing the least two significant bits. This technique, however, permanently loses some image data. In another compression technique, pixel values can be scaled from 10-bits to 9-bits, 8-bits, or even 7-bits while remaining within the signal-to-noise ratio (SNR) parameters of SOC camera sensor data. Because of their small pixels, SOC cameras typically have a low SNR. For instance, a small pixel having a 10-bit dynamic range and a full well capacity of 10,000 electrons has a maximum SNR of sqrt(10,000)=100, which can be efficiently encoded using a value log(100) that is only 7 bits long. Thus, if the imager employs 10-bit pixel values from 0 to 1023, with the signal levels corresponding to the pixel value of 1023 at full well capacity, this data can be encoded to values as low as 7-bits. Similarly, for any other signal level D the data can be encoded at that level using log2(SNR(D)) bits.

One approach to choosing a bit width of pixel data for encoding an image signal in the presence of noise is now provided. In this approach, analog values of a signal S, for $S_0 < S < S_{max}$ having noise $\sigma(S)$, where $\sigma(S)$ is a monotonously increasing function of S, are each encoded into a digital value D(S):

$$D(S_0)=0$$

$$D(S)=\text{round}((S-S_0)/\sigma(S_0))[\text{LSB}]$$

An increment of one least significant bit (LSB) in the digital value D(S) corresponds to an increment of $\sigma(S_0)$ in the analog signal value. Analog values at or below the noise floor $\sigma(S_0)$ are deemed meaningless and set to zero. The encoding function Fc(i)=f(D) is constructed such that D corresponds approximately to the analog value associated with signal level S and noise $\sigma(S)$. At that signal level D, an increment of one LSB of Fc can typically be set to correspond to $\sigma(S)$ instead of $\sigma(0)$. In particular, $dFc(S)/dS=\sigma(S_0)/\sigma(S)$ or, as expressed in terms of D in LSB, $dFc(i)/1 \text{ LSB}=\sigma(0)/\sigma(i)$. From these equations, the encoding function Fc can be approximated as follows:

$$Fc(0)=0$$

$$Fc(i)=\text{round}(\sigma(S_0)*\text{sum}_{k=0\ldots i-1}(\sigma^{-1}(S|D(S)=k))), i>0$$

or as expressed in LSB $$Fc(0)=0$$

$$Fc(i)=\text{round}(\sigma(0)*\text{sum}_{k=0\ldots i-1}(\sigma^{-1}(k))), i>0$$

For example, suppose that noise of $S_0$, expressed in LSB $\sigma(0)=\sigma(D(S_0))$, is 1.5 LSB, noise of D(1) is 1.7 LSB, noise of D(2) is 2 LSB, and noise of D(3) is 2.2 LSB. According to the equation above:

$$Fc(1)=\text{round}(1.5/1.7)=1$$

$$Fc(2)=(1.5/1.7+1.5/2)=2$$

$$Fc(3)=(1.5/1.7+1.5/2+1.5/2.2)=2$$

The decoding function $f_C^{-1}$ is the inverse function of $f_C(i)$.

Figure 4:
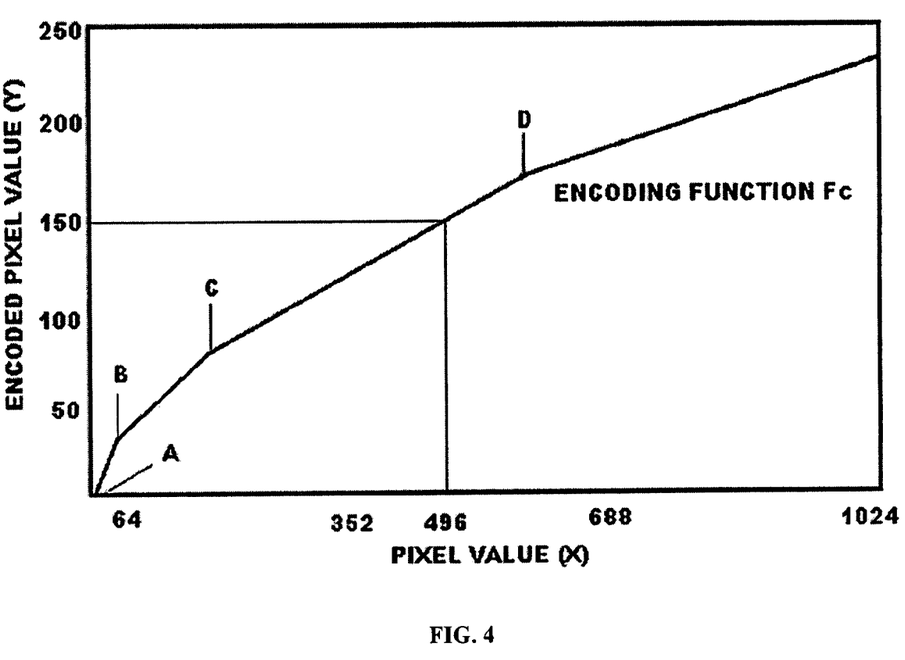
FIG. 4 is graphical representation of an encoding function which may be employed by the line memory compression system 300B.

FIG. 4 is a graph illustrating a non-limiting example of an encoding function Fc which may be used by the compressor 330 to compress 10-bit data to 8-bit data. As noted, however, depending on actual sensor noise parameters $\sigma(S)$, there may be cases where the 10-bit data can be compressed to 7-bit data without a significant further loss of image quality. Thus, before the incoming image line is stored to the first line buffer 340A, it is compressed to a reduced bit-width using the encoding function Fc. During decompression, the reduced bit-width pixel values are read out of the line buffers 340A-E and then subjected to an inverse compression transform $Fc^{-1}$ of the encoding function Fc. In this example, the encoding function Fc is constructed as a piecewise linear function to simplify and reduce its hardware implementation within the SOC design. The lowest values $X_i, Y_i$ of each linear component of Fc are designated by knee points i, which are shown in FIG. 4 as reference characters A-D. Each linear segment correlates respective 10-bit values (X-axis) to 8-bit values (Y-axis). For instance, the linear component spanning knee points C and D correlates a 10-bit pixel value of 496 to an 8-bit value of 150.

Figure 5A:
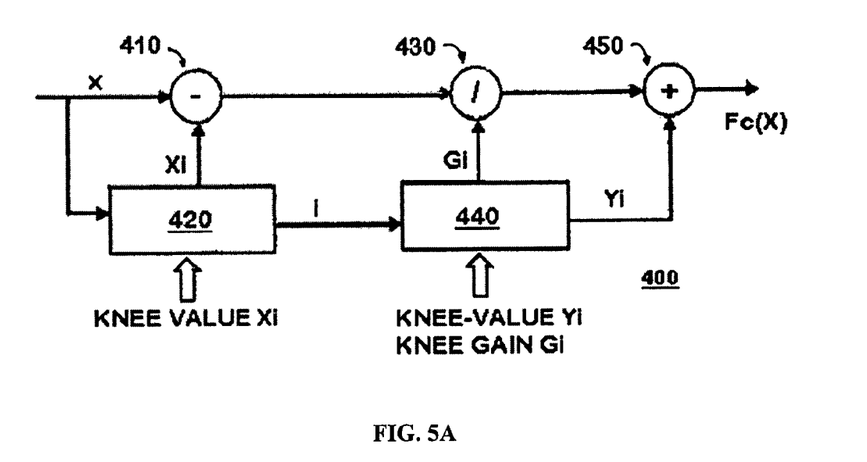
FIG. 5A is a functional block diagram of an encoder 400 which may be employed by the line memory 300B.

FIG. 5A is a functional block diagram illustrating a non-limiting example of an encoder 400 for implementing the encoding function Fc to determine the compression correlation shown in FIG. 4. In this example, the piecewise linear transform Fc is defined by a monotonously increasing function as follows:

$$Fc(X) = Y_i + [(X-X_i)/G_i]$$

$$Y_{i+1} > Y_i, \text{ and}$$

$$X_{i+1} > X_i,$$

where "i" is one of the knee points A-D. In practice, knees xi and gains Gi may be selected such that $Gi < \square(k)/\square(0)$ for all values k in knee i. This prevents significant bits from being discarded during the encoding. Each uncompressed 10-bit pixel value X is input to comparator 420 to determine the reference 10-bit value $X_i$, which is the 10-bit value corresponding to the knee-point. The value $X_i$ is output to operator 410, which inputs both X and $X_i$, calculates $(X-X_i)$, and outputs the value to operator 430. The value $X_i$ is also output to a gain selector 440, which determines the appropriate gain $G_i$ for encoding. In this example, the gain $G_i$ is the slope for the applicable linear component of Fc. In an implementation compressing 10-bit values to 8-bit values, the gain $G_i$ for each linear component of the encoding function Fc could be a 3-bit value from 1 to 7. Because each 10-bit value of a streaming image line is divided by a mere 3-bit value from 1 to 7, the hardware for implementing operator 430 does not consume a significant amount of the chip space.

The gain selector 440 outputs the gain $G_i$ to operator 430, and outputs the 8-bit reference value $Y_i$ as an input to operator 450. The reference 10-bit value $X_i$, reference 8-bit value $Y_i$, and gain $G_i$ may each be determined using look-up tables. These values define the equation of the linear component corresponding to $X_i$, which is in turn used to determine the encoded 8-bit value corresponding to the input 10-bit value X. As there are only 3 knee-points of the piecewise linear function in this example, there are few corresponding values of $X_i$, $Y_i$, and $G_i$ to be determined.

Figure 5B:
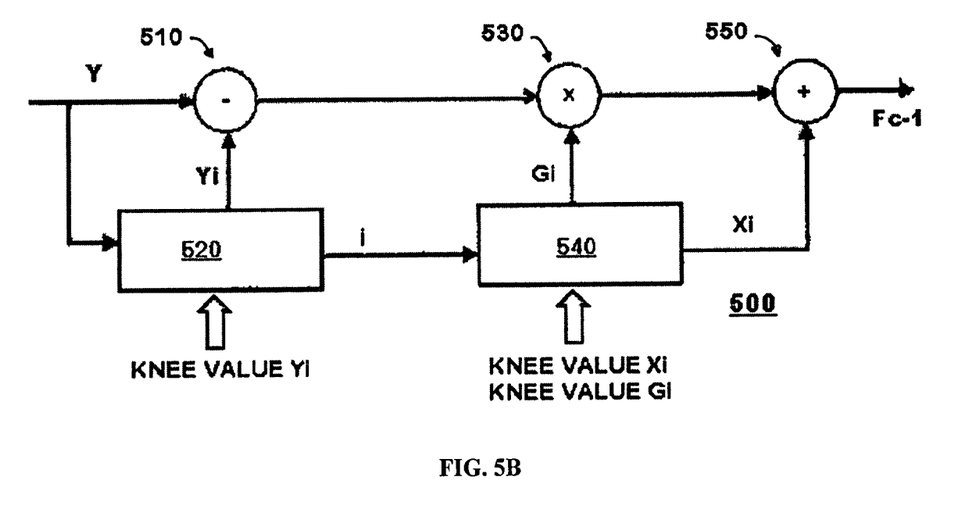
FIG. 5B is a functional block diagram of a decoder 500 which may be employed by the line memory 300B.

FIG. 5B is a functional block diagram illustrating a non-limiting example of a respective decompressor 350A-E for implementing the decoding function $Fc^{-1}$, which in this example decodes a compressed image line by rescaling the encoded 8-bit pixel values X to their respective 10-bit pixel values Y. The decoding function may be expressed as follows: $Fc^{-1}(X) = X_i + [(Y-Y_i)/G_i^{-1}]$ or, as simplified, $Fc^{-1}(X) = X_i + [(Y-Y_i)*G_i]$. Each compressed 8-bit pixel value Y is input to comparator 520 to determine the reference 8-bit value $Y_i$ corresponding to the applicable linear component for decoding that value. The reference value $Y_i$ is output to operator 510, which inputs both Y and $Y_i$, calculates $(Y-Y_i)$, and outputs the resultant value to operator 530. In addition, the comparator outputs the knee-point value i to a gain selector 540, which determines the gain value $G_i$ corresponding to the applicable linear component. Similar to the encoding operation, because the 8-bit values are of the compressed image line are streamed and multiplied by a mere 3-bit gain value in one of the respective decompressors 350A-E, little hardware is needed by each of the decompressors 350A-E. Also similar to the encoding operation, the knee-point value i, reference 8-bit value $Y_i$, and gain value $G_i$ corresponding to the input 8-bit value X can be determined from look-up tables.

Though the above examples describe the line memory 300B as employing a predetermined compression technique with a constant compression ratio, which, e.g., reduces 10-bit pixel values to 8-bit pixel values, the compression and decompression employed is not limited to the specific techniques disclosed herein. Any type of lossy or lossless compression may be used, including those disclosed in related co-pending application Ser. No. 11/878,606, filed Jul. 25, 2007, entitled "Method, Apparatus, and System for a Pre-Compression Assessment of Compressed Data Length", the disclosure of which is incorporated by reference herein.

Figure 6:
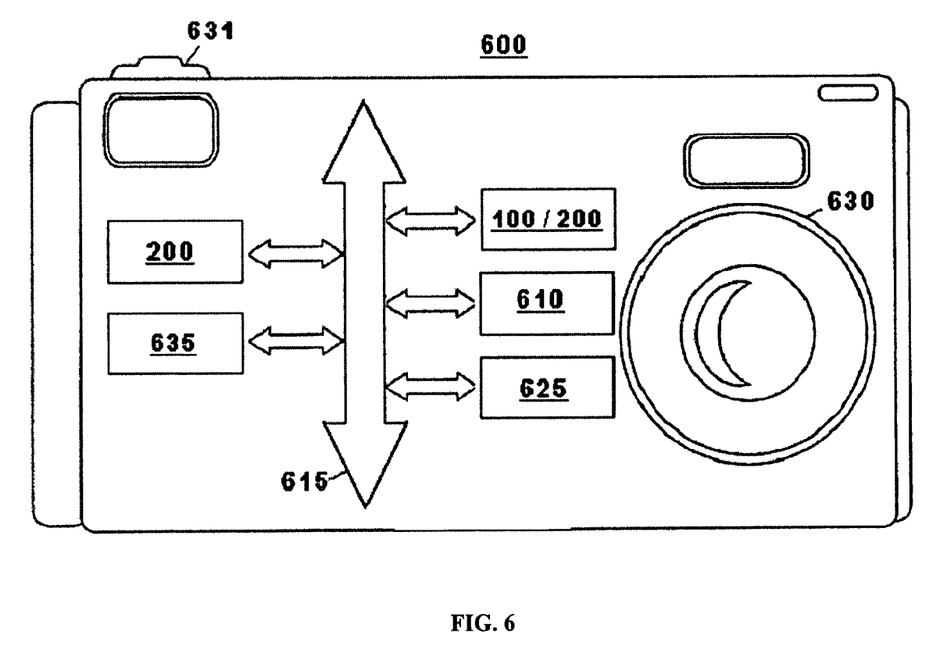
FIG. 6 is a block diagram of an imaging system 600 which may employ embodiments of the invention.

FIG. 6 is a non-limiting example of a camera system 600 which may employ the disclosed embodiments. The camera system 600, which illustrates a still or video camera system, generally comprises a lens 630 for focusing an incoming image on pixel array 105 to capture an image when a shutter release button 631 is pressed. Also provided is the imager device 100 and associated image processor 200, which may be on the same chip, as in an SOC design, and which may communicate over a bus 615 with one or more input/output (I/O) devices 610 and a CPU 620 for controlling the imager system 600, e.g., camera functions. The system 600 may include random access memory (RAM) 625. Removable memory 635, such as for instance flash memory may also be provided as part of system 600.

The embodiments described herein can be modified to incorporate any number of variations, alterations, substitutions or equivalent arrangements not heretofore described, but which are commensurate with the spirit and scope of the invention. For example, the above embodiments are described with reference to the processing of image data contained in line buffers. Those skilled in the art will appreciate that the embodiments disclosed herein may be applied to other line data which requires multiple line processing. Accordingly, the claimed invention is not limited by the foregoing description or drawings, but is only limited by the scope of the appended claims.

What is claimed as new and desired to be protected by the Letters Patent of the United States is:

1. A method of image processing, comprising:
   sequentially performing a first image processing operation on each line of image data in a plurality of lines of image data;
   compressing each of the lines of image data in the plurality of lines of image data;
   storing each of the plurality of lines of image data in one of a plurality of line buffers;
   simultaneously outputting the plurality of lines of image data from the plurality of line buffers;
   simultaneously decompressing the plurality of lines of image data that are output from the plurality of line buffers to produce a plurality of decompressed lines of data; and
   performing a second image processing operation on the plurality of decompressed lines of data.

2. The method of claim 1, wherein the acts of compressing, storing, and performing the first and second image processing operations are performed by circuitry on a single integrated circuit chip.

3. The method of claim 1, wherein the second image processing operation includes defect correction processing.

4. The method of claim 1, wherein the second image processing operation includes noise reduction processing.

5. The method of claim 1, wherein the second image processing operation includes optical crosstalk reduction processing.

6. The method of claim 1, wherein the second image processing operation includes demosaic processing.

7. The method of claim 1, wherein the second image processing operation includes image resizing.

8. The method of claim 1, wherein the second image processing operation includes image sharpening.

9. The method of claim 1, wherein the act of compressing comprises converting M-bit image pixel values to lesser N-bit image pixel values, where M and N are integers and N is based on a signal-to-noise ratio of the M-bit image pixel values.

10. The method of claim 9, wherein the act of compressing encodes the lines of image data based on a linear encoding function.

11. The method of claim 10, wherein the linear encoding function is a piecewise linear transform comprising two or more linear segments that map the M-bit and N-bit image pixel values to one another.

12. The method of claim 1, wherein the line buffers form a line memory of serially connected FIFO line buffers, and each of the line buffers directly outputs the stored line of image data from the line memory.

13. The method of claim 12, wherein performing the second image processing operation comprises performing the second image processing operation on the plurality of decompressed lines of image data and a line of image data being input to a sequentially first line buffer of the serially connected FIFO line buffers.

14. An imaging device, comprising:
- an image sensing array for successively outputting each line of image data in a plurality of lines of image data;
- a first processor circuit for sequentially performing a first image processing operation on each line of image data in the plurality of lines of image data;
- a compressor for compressing the plurality of lines of image data;
- a line memory having a plurality of FIFO line buffers, wherein the plurality of FIFO lines buffers are configured to serially receive each line of image data in the plurality of lines of image data and wherein the plurality of FIFO lines buffers are configured to simultaneously output the plurality of lines of image data; and
- a second processor circuit for performing a second image processing operation on the plurality of lines of image data.

15. The imaging device of claim 14, further comprising:
- a decompressor for decompressing the lines of image data for use by the second processor circuit.

16. The imaging device of claim 15, wherein the second processor circuit performs the second image processing operation on the decompressed lines of image data from the decompressor and a line of uncompressed image data being input to the second image processor.

17. The imaging device of claim 14, wherein the image sensing array, compressor, line memory, and second processor circuit are each part of a single integrated circuit chip.

18. The imaging device of claim 14, wherein the second image processing operation includes defect correction processing.

19. The imaging device of claim 14, wherein the second image processing operation includes noise reduction processing.

20. The imaging device of claim 14, wherein the second image processing operation includes optical crosstalk reduction processing.

21. The imaging device of claim 14, wherein the second image processing operation includes demosaic processing.

22. The imaging device of claim 14, wherein the second image processing operation includes image resizing.

23. The imaging device of claim 14, wherein the second image processing operation includes image sharpening.

24. The imaging device of claim 14, wherein the compressor converts M-bit image pixel values to lesser N-bit image pixel values, where M and N are integers and N is based on a signal-to-noise ratio of the M-bit image pixel values.

25. The imaging device of claim 24, wherein the compressor encodes the lines of image data based on a linear encoding function.

26. The imaging device of claim 25, wherein the linear encoding function is a piecewise linear transform comprising two or more linear segments that map the M-bit and N-bit image pixel values to one another.

* * * * *